United States Patent
Han et al.

(10) Patent No.: US 9,763,131 B2
(45) Date of Patent: Sep. 12, 2017

(54) METHOD AND SYSTEM FOR TRANSMITTING DATA PACKET, SENDING END DEVICE AND RECEIVING END DEVICE

(71) Applicant: Huawei Technologies Co., Ltd., Shenzhen (CN)

(72) Inventors: Guanglin Han, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 228 days.

(21) Appl. No.: 14/486,516

(22) Filed: Sep. 15, 2014

(65) Prior Publication Data
US 2015/0003242 A1 Jan. 1, 2015

Related U.S. Application Data
(63) Continuation of application No. PCT/CN2013/072700, filed on Mar. 15, 2013.

(30) Foreign Application Priority Data

Mar. 15, 2012 (CN) .......................... 2012 1 0068125

(51) Int. Cl.
*H04W 28/02* (2009.01)
*H04W 72/12* (2009.01)
(Continued)

(52) U.S. Cl.
CPC ......... *H04W 28/0268* (2013.01); *H04L 47/24* (2013.01); *H04L 47/2433* (2013.01);
(Continued)

(58) Field of Classification Search
None
See application file for complete search history.

(56) References Cited

U.S. PATENT DOCUMENTS 6,668,175 B1 * 12/2003 Almgren ............. H04L 12/5695
455/516

8,194,593 B2 * 6/2012 Jing .................... H04L 12/5693
370/230.1
(Continued)

FOREIGN PATENT DOCUMENTS

| CN | 101557282 A | 10/2009 |
|----|-------------|---------|
| CN | 101646074 A | 2/2010 |
| CN | 101662414 A | 3/2010 |
| CN | 101808037 A | 8/2010 |
| CN | 102340535 A | 2/2012 |
| EP | 2293484 A1 | 3/2011 |

OTHER PUBLICATIONS

Lte, "3rd Generation Partnership Project; Technical Specification Group Radio Access Network; Evolved Universal Terrestrial Radio Access (E-UTRA); Radio Link Control (RLC) protocol specification" (Release 10) 3GPP TS 36.322, V10.0.0, Dec. 2010, 39 pages.
(Continued)

*Primary Examiner* — Candal Elpenord
(74) *Attorney, Agent, or Firm* — Brinks Gilson & Lione

(57) ABSTRACT

Embodiments of the present invention provide a method and a system for transmitting a data packet, a sending end device and a receiving end device. The method includes: determining quality of service requirement information of service data according to content or type of the service data; carrying the quality of service requirement information in a data packet corresponding to the service data; and sending the data packet carrying the quality of service requirement information to a receiving end, so as for the receiving end to perform scheduling processing on the data packet according to the quality of service requirement information. By adopting the technical solution of the embodiments of the present invention, a received data packet is scheduled according to the quality of service requirement information, thereby effectively improving the processing efficiency of the data packet.

4 Claims, 4 Drawing Sheets

(51) Int. Cl.
*H04L 12/851* (2013.01)
*H04L 29/08* (2006.01)

(52) U.S. Cl.
CPC .......... *H04L 67/322* (2013.01); *H04W 28/02* (2013.01); *H04W 72/1236* (2013.01)

(56) References Cited

U.S. PATENT DOCUMENTS

| | | | |
|---|---|---|---|
| 2003/0035396 A1 | 2/2003 | Haartsen et al. | |
| 2006/0203754 A1* | 9/2006 | Ejiri | H04L 47/14 370/310.1 |
| 2006/0268749 A1 | 11/2006 | Rahman et al. | |
| 2008/0056273 A1* | 3/2008 | Pelletier | H04L 69/04 370/395.21 |
| 2008/0273504 A1* | 11/2008 | Foley | H04L 12/66 370/337 |
| 2009/0147731 A1 | 6/2009 | Chion et al. | |
| 2012/0155313 A1* | 6/2012 | Hirano | H04W 48/14 370/252 |

OTHER PUBLICATIONS

Lte, "3$^{rd}$ Generation Partnership Project; Technical Specification Group Radio Access Network; Evolved Universal Terrestrial Radio Access (E-UTRA); Packet Data Convergence Protocol (PDCP) specification" (Release 10), 3GPP TS 36.323, V10.1.0, Mar. 2011, 26 pages.

Lte, "3$^{rd}$ Generation Partnership Project; Technical Specification Group Radio Access Network; Evolved Universal Terrestrial Radio Access (E-UTRA); Medium Access Control (MAC) protocol specification" (Release 10) 3GPP TS 36.321, V10.4.0, Dec. 2011, 54 pages.

Lte, "3$^{rd}$ Generation Partnership Project; Technical Specification Group Radio Access Network; Evolved Universal Terrestrial Radio Access (E-UTRA); Radio Resource Control (RRC); Protocol specification" (Release 10) 3GPP TS 36.331, V10.5.0, Mar. 20012, 302 pages.

* cited by examiner

METHOD AND SYSTEM FOR TRANSMITTING DATA PACKET, SENDING END DEVICE AND RECEIVING END DEVICE

CROSS-REFERENCE TO RELATED APPLICATIONS

This application is a continuation of International Application No. PCT/CN2013/072700, filed on Mar. 15, 2013, which claims priority to Chinese Patent Application No. 201210068125.9, filed on Mar. 15, 2012, both of which are hereby incorporated by reference in their entireties.

TECHNICAL FIELD

The present invention relates to communication systems, and in particular to a method and a system for transmitting a data packet, a sending end device and a receiving end device.

BACKGROUND

In an evolved packet system (Evolved Packet System, EPS), service data of user equipment (User Equipment, UE) is transmitted by using a bearer (Bearer), and in accordance with different networks passing by service data in a bearer, a Bearer includes two types, namely, a core network (Core Network, CN) bearer and a radio access network (Radio Access Network, RAN) bearer.

In an existing radio network, for a particular service, an RAN bearer may adopt two transmission modes in a radio link control (Radio Link Control, RLC) layer, i.e., an acknowledged mode (Acknowledged Mode, AM) and an un-acknowledged mode (Un-acknowledged mode, UM). In an AM mode, an RLC layer transmits service data by adopting an automatic repeat-request (Automatic Repeat-reQuest, ARQ) mechanism, and a receiving end acknowledges each data packet sent by the sending end, so as to indicate that the data packet is received correctly. The AM mode is applicable to a service transmission requiring relatively low latency and relatively high reliability. In an UM mode, an RLC layer is only responsible for sending and receiving a data packet, and does not retransmit a sent data packet and feed back acknowledgment regarding a received data packet. Compared with the AM mode, the UM mode is mainly applicable to a service requiring higher latency and lower reliability.

The prior art has at least following shortcoming, namely, in a transmission mode adopted by an existing radio network, either for a CN bearer or an RAN bearer, or in an AM mode or a UM mode of an RAN bearer, data packets corresponding to different types of service data in a service are processed intensively, resulting in low processing efficiency of a data packet.

SUMMARY

Embodiments of the present invention provide a method and a system for transmitting a data packet, a sending end device and a receiving end device, aiming at solving the shortcoming of the prior art, which is low processing efficiency of a data packet.

In one aspect, an embodiment of the present invention provides a method for transmitting a data packet, including:

determining, by a sending end, quality of service requirement information of service data according to content or type of service data, wherein the quality of service requirement information includes at least one of transmission latency priority, transmission reliability priority, a packet loss indication and an emergency indication;

carrying, by the sending end, the quality of service requirement information in a data packet corresponding to the service data; and sending, by the sending end, the data packet carrying the quality of service requirement information to a receiving end, so as for the receiving end to perform scheduling processing on the data packet according to the quality of service requirement information.

In another aspect, an embodiment of the present invention further provides a method for transmitting a data packet, including:

receiving, by a receiving end, a data packet carrying quality of service requirement information, that is sent by a sending end, wherein the quality of service requirement information is determined by the sending end according to content or type of service data, and the quality of service requirement information includes at least one of transmission latency priority, transmission reliability priority, a packet loss indication and an emergency indication; and performing, by the receiving end, scheduling processing on the data packet according to the quality of service requirement information.

In another aspect, an embodiment of the present invention further provides a sending end device, including:

a determining module, configured to determine quality of service requirement information of service data according to content or type of the service data, wherein the quality of service requirement information includes at least one of transmission latency priority, transmission reliability priority, a packet loss indication and an emergency indication;

a processing module, configured to carry the quality of service requirement information in a data packet corresponding to the service data; and a sending module, configured to send the data packet carrying the quality of service requirement information to a receiving end device, so as for the receiving end device to schedule the data packet according to the quality of service requirement information.

In another aspect, an embodiment of the present invention further provides a receiving end device, including:

a receiving module, configured to receive a data packet carrying quality of service requirement information, that is sent by sending end device, wherein the quality of service requirement information is determined by the sending end device according to content or type of service data, and the quality of service requirement information includes at least one of transmission latency priority, transmission reliability priority, a packet loss indication and an emergency indication; and a processing module, configured to perform scheduling processing on the data packet according to the quality of service requirement information.

In another aspect, an embodiment of the present invention further provides a system for transmitting a data packet, including the above-mentioned sending end device and the above-mentioned receiving end device.

According to the method and system for transmitting a data packet, the sending end device and the receiving end device provided by the embodiments of the present invention, the sending end determines quality of service requirement information of service data according to content or type of the service data, wherein the quality of service requirement information includes at least one of transmission latency priority, transmission reliability priority, a packet loss indication and an emergency indication, and carries the quality of service requirement information in a data packet sent to a receiving end, so that the receiving end may perform scheduling processing on the received data packet according to the quality of service requirement information. By adopting the technical solutions of the embodiments of the present invention, a shortcoming of the prior art, that is, low processing efficiency of data packets, caused by centralized processing of all data packets, may be overcome, and a received data packet is scheduled according to the quality of service requirement information, thereby effectively improving the processing efficiency of the data packet.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DESCRIPTION OF EMBODIMENTS

To make purpose, technical solutions and merits of the embodiments of the present invention more clear, the technical solutions in the embodiments of the present invention are described clearly and fully hereinafter in conjunction with the drawings in the embodiments of the present invention. Apparently, the embodiments described are only a part, but not all, of the embodiments of the present invention. All other embodiments, which can be derived by the persons of ordinary skills in the art based on the embodiments of the present invention without any inventive efforts, fall into the protection scope of the present invention.

Figure 1:
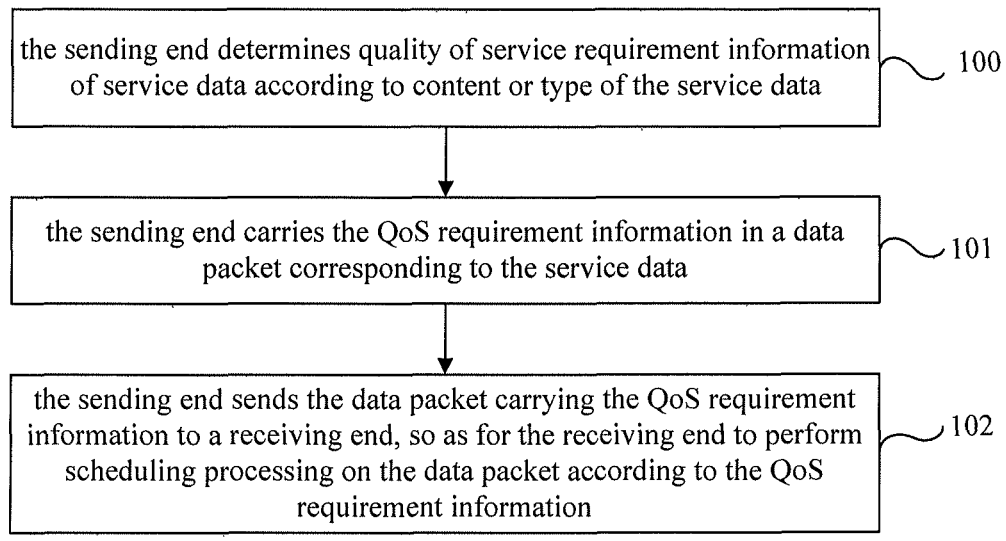
FIG. 1 is a flowchart of a method for transmitting a data packet provided by an embodiment of the present invention.

FIG. 1 is a flowchart of a method for transmitting a data packet provided by an embodiment of the present invention. As shown by FIG. 1, an execution subject of the method for transmitting a data packet of the present embodiment is a sending end. The method for transmitting a data packet of the present embodiment may specifically include the following steps.

100, the sending end determines quality of service (Quality of Service, QoS) requirement information of service data according to content or type of the service data.

The QoS requirement information of the present embodiment includes at least one of transmission latency priority, transmission reliability priority, a packet loss indication and an emergency indication.

Higher transmission latency priority represents higher requirement on latency for a data packet and smaller requirement on transmission latency, and different transmission latency priorities correspond to different latency requirements of a transmission process. Higher transmission reliability priority represents higher requirement on reliability for a data packet, and different transmission reliability priorities correspond to different reliability requirements of a transmission process. The packet loss indication is used for indicating whether a data packet is discardable. The emergency indication is used for indicating whether a data packet is an emergency data packet. For an emergency data packet, a transmission device on a transmission path may transmit the data packet prior to other non-emergency data packet.

101, the sending end carries the QoS requirement information in a data packet corresponding to the service data.

102, the sending end sends the data packet carrying the QoS requirement information to a receiving end, so as for the receiving end to perform scheduling processing on the data packet according to the QoS requirement information.

According to the method for transmitting a data packet of the present embodiment, the sending end sets the QoS requirement information for the service data according to the content or type of the service data, wherein the QoS requirement information includes at least one of transmission latency priority, transmission reliability priority, a packet loss indication and an emergency indication, and carries the QoS requirement information in the data packet sent to the receiving end, so that the receiving end may perform scheduling processing on the received data packet according to the QoS requirement information. By adopting the technical solution of the present embodiment, a shortcoming of the prior art, that is relatively low processing efficiency of a data packet, caused by centralized processing of all data packets, may be overcome, and by performing scheduling processing on the received data packet according to the QoS requirement information, processing efficiency of the data packet can be effectively improved.

Optionally, based on the above-mentioned embodiment shown in FIG. 1, the following optional technical solutions may be further included to form an expanded embodiment of the embodiment shown in FIG. 1.

In the expanded embodiment of the present embodiment shown by FIG. 1, the sending end may specifically be a gateway node (Gateway node) or a server (Server), and the receiving end is a base station (e.g., eNodeB). In this case, correspondingly, the step 101 and the step 102 in the above-mentioned embodiment may specifically include the following conditions.

First condition: when the service data is video service data, in the embodiment shown by FIG. 1, the step 101, the sending end carries the QoS requirement information in a data packet corresponding to the service data, may specifically include: the sending end carries the QoS requirement information in a residual bit of an initialization segment (Initialization Segment) and/or a media segment (Media Segment). The media segment herein refers to a media data segment.

Correspondingly, in the embodiment shown by FIG. 1, the step 102, the sending end sends the data packet carrying QoS requirement information to the receiving end, so as for the receiving end to perform scheduling processing on the data packet according to the QoS requirement information, may specifically include: the sending end sends the data packet including the Initialization Segment and/or the Media Segment to the receiving end, so as for the receiving end to perform scheduling processing on the data packet including the Initialization Segment and/or the Media Segment according to the QoS requirement information carried in the Initialization Segment and/or the Media Segment. The data packet including the Initialization Segment and/or the Media Segment contains the Initialization Segment and/or the Media Segment and data content, and the QoS requirement information is carried in the Initialization Segment and/or the Media Segment.

Second condition: when the service data is video service data, in the embodiment shown by FIG. 1, the step 101, the sending end carries the QoS requirement information in a data packet corresponding to the service data, may specifically include: the sending end carries the QoS requirement information in a newly added bit of an initialization segment and/or a media segment.

Correspondingly, in the embodiment shown by FIG. 1, the step 102, the sending end sends the data packet carrying QoS requirement information to the receiving end, so as for the receiving end to perform scheduling processing on the data packet according to the QoS requirement information, may specifically include: the sending end sends the data packet including the Initialization Segment and/or the Media Segment to the receiving end, so as for the receiving end to perform scheduling processing on the data packet including the Initialization Segment and/or the Media Segment according to the QoS requirement information carried in the Initialization Segment and/or the Media Segment.

Furthermore, optionally, when the service data is video service data, in this case, the corresponding QoS requirement information may further include at least one of inter-frame dependency information, quality information of a frame and indication information of a layer.

The inter-frame dependency information represents dependency relationship of frames, namely, representing whether a video data packet is referred to by other data packet, reference degree and the like. The quality information of a frame represents information on extent of influence of current data packet on video playback quality. The indication information of a layer represents whether the current data packet is a data packet of a basic layer or a data packet of an enhancement layer when the video data is processed in a manner of hierarchical coding.

Taking video service as an example, a relatively higher transmission priority is set for a data packet corresponding to a primary key frame and/or a referred frame of a video, and a relatively lower transmission priority may be set for a data packet corresponding to other unimportant data or corresponding to other data with relatively lower reliability. By employing this manner, it may be ensured that a key data packet can be transmitted to a user reliably, thereby improving watching experience of a user under narrowband transmission.

Taking real-time video service as an example, for video data approaching absolute playback time (absolute time for which a certain frame is required to be played by a client in live broadcast), transmission latency of the service data may be set to high priority and/or the video data is set as emergency data; otherwise, transmission latency of the service data may be set to low priority and/or the service data may be set as non-emergency.

Taking video service as an example, for a key data packet necessary for video playback, such as, for example, a data packet containing metadata, or a data packet referred to by one or multiple frames, it may be set as not allowed to be discarded, and a data packet containing common video data may be set as allowed to be discarded.

Figure 2:
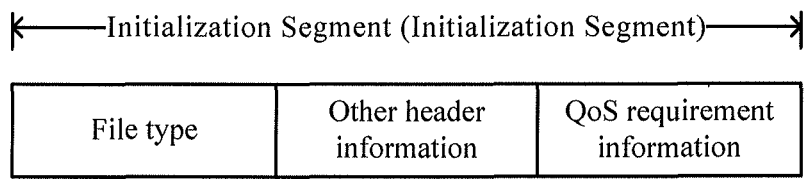
FIG. 2 is a diagram of a data format of an Initialization Segment provided by an embodiment of the present invention.
Figure 3:
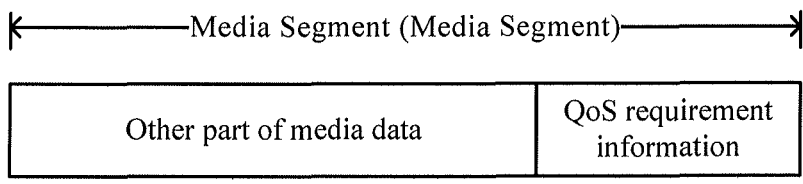
FIG. 3 is a diagram of a data format of a Media Segment provided by an embodiment of the present invention.
Figure 4:
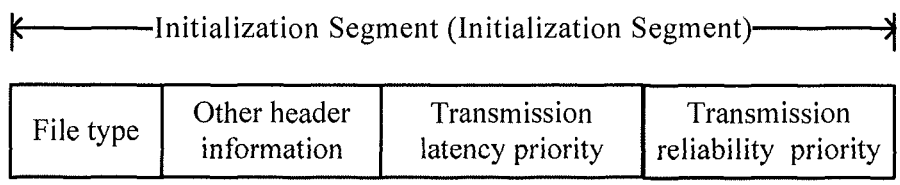
FIG. 4 is a diagram of a data format chart of another Initialization Segment provided by an embodiment of the present invention.

FIG. 2 is a diagram of a data format of an Initialization Segment provided by an embodiment of the present invention. FIG. 3 is a diagram of a data format of a Media Segment provided by an embodiment of the present invention. As shown by FIG. 2 and FIG. 3, a new bit is added in both the Initialization Segment and the Media Segment to carry the QoS requirement information, for example, which one of the transmission latency priority, the transmission reliability priority, the packet loss indication and the emergency indication is carried by the QoS requirement information may be predefined. FIG. 4 is a diagram of a data format of another Initialization Segment provided by an embodiment of the present invention. As shown by FIG. 4, as an example, two new bits are added in the Initialization Segment to carry transmission latency priority and transmission reliability priority. FIG. 4 is merely an optional solution, in practical application, at least one of transmission latency priority, transmission reliability priority, a packet loss indication, an emergency indication, inter-frame dependency information, quality information of a frame and indication information of a layer may be carried in the Initialization Segment and the Media Segment, and which one or ones thereof are specifically carried may be predefined, which will not be enumerated herein.

Third condition: in the embodiment shown by FIG. 1, the step 101, the sending end carries the QoS requirement information in a data packet corresponding to the service data, may specifically include: the sending end adds first expansion header information in a packet header of a general packet radio service tunnelling protocol (General Packet Radio Service Tunnelling Protocol; GTP) data packet, wherein the GTP data packet includes service data; and the sending end carries the QoS requirement information in the first expansion header information.

Correspondingly, in the embodiment shown by FIG. 1, the step 102, the sending end sends the data packet carrying QoS requirement information to the receiving end, so as for the receiving end to perform scheduling processing on the data packet according to the QoS requirement information, may specifically include: the sending end sends the GTP data packet carrying the QoS requirement information to the receiving end, so as for the receiving end to perform scheduling processing on the data packet according to the QoS requirement information.

Figure 5:
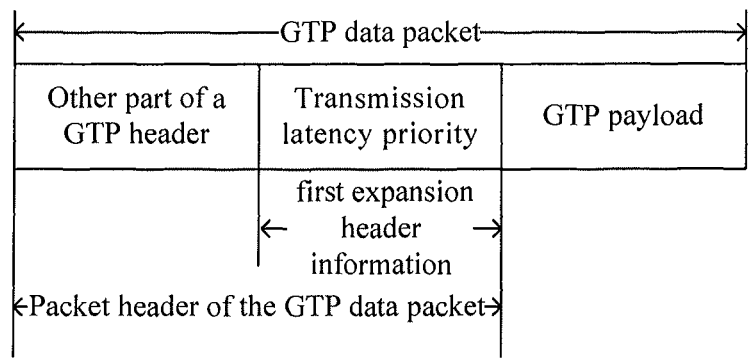
FIG. 5 is a diagram of a data format of a GTP data packet provided by an embodiment of the present invention.

FIG. 5 is a diagram of a data format of a GTP data packet provided by an embodiment of the present invention. As shown by FIG. 5, as an example, first expansion header information is newly added in a packet header of the GTP data packet shown in FIG. 5, and transmission latency priority is added in the first expansion header information. In practical application, one or more of transmission latency priority, transmission reliability priority, a packet loss indication and an emergency indication may be specifically added in the first expansion header information, which will not be enumerated herein.

Fourth condition: in the embodiment shown by FIG. 1, the step 101, the sending end carries the QoS requirement information in a data packet corresponding to the service data, may specifically include: the sending end carries the QoS requirement information in a packet header of an Internet Protocol (Internet Protocol, IP) data packet;

and correspondingly, in the embodiment shown by FIG. 1, the step 102, the sending end sends the data packet carrying QoS requirement information to the receiving end, so as for the receiving end to perform scheduling processing on the data packet according to the QoS requirement information, may specifically include: the sending end sends the IP data packet carrying the QoS requirement information to the receiving end, so as for the receiving end to perform scheduling processing on the data packet according to the QoS requirement information.

Optionally, in an expanded embodiment of the embodiment shown by FIG. 1, the sending end may specifically be a base station (e.g., eNodeB), and the receiving end may specifically be user equipment (User Equipment, UE). In this case, correspondingly, the step 101 and the step 102 in the above-mentioned embodiment may specifically include the following conditions.

First condition: in the embodiment shown in FIG. 1, the step 101, the sending end carries the QoS requirement information in a data packet corresponding to the service data, may specifically include: the sending end adds second expansion header information in a packet header of a packet data convergence protocol (Packet Data Convergence Protocol, PDCP) data packet, wherein the PDCP data packet includes service data; and the sending end carries the QoS requirement information in the second expansion header information.

Correspondingly, in the embodiment shown in FIG. 1, the step 102, the sending end sends the data packet carrying QoS requirement information to the receiving end, so as for the receiving end to perform scheduling processing on the data packet according to the QoS requirement information, may specifically include: the sending end sends the PDCP data packet carrying the QoS requirement information to the receiving end, so as for the receiving end to perform scheduling processing on the data packet according to the QoS requirement information.

Figure 6:
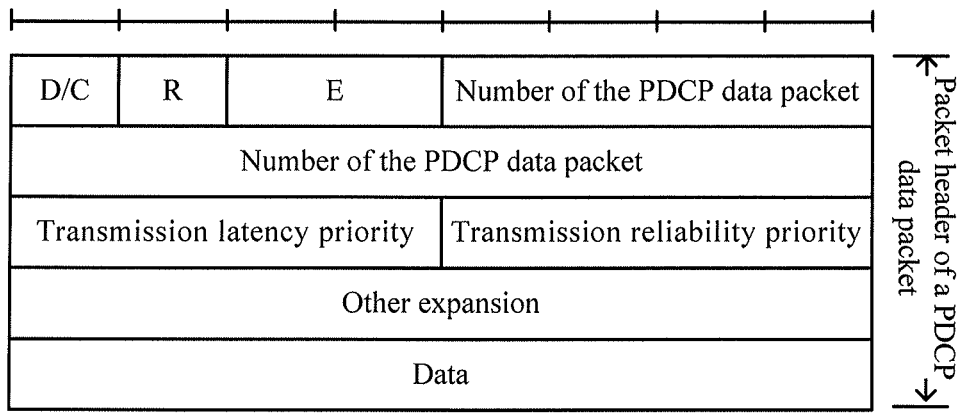
FIG. 6 is a diagram of a data format of a PDCP data packet provided by an embodiment of the present invention.

FIG. 6 is a diagram of a data format of a PDCP data packet provided by an embodiment of the present invention. As shown in FIG. 6, as an example, second expansion header information is newly added in a packet header of the PDCP data packet, and transmission latency priority and transmission reliability priority are added in the second expansion header information. For example, at least one indication E of an expansion header may be newly added in a packet header of the PDCP data packet, and is used for indicating whether to use expansion header information and/or indicating a type of the expansion header. For example, an expansion header indication E shown in FIG. 6 is used for indicating that the packet header of current PDCP data packet has an expansion of header information carrying the QoS requirement information, wherein D/C indicates that, 0 represents data, and 1 represents control information, R represents being reserved, and E represents an expansion header indication. A sequence number of the PDCP data packet is divided into two rows, the first row is 4 bits and the second row is 8 bits.

Second condition: in the embodiment shown in FIG. 1, the step 101, the sending end carries the QoS requirement information in a data packet corresponding to the service data, may specifically include: the sending end adds third expansion header information in a packet header of a radio link control (Radio Link Control, RLC) protocol data packet, wherein the RLC protocol data packet includes service data; and the sending end carries the QoS requirement information in the third expansion header information.

Correspondingly, in the embodiment shown in FIG. 1, the step 102, the sending end sends the data packet carrying QoS requirement information to the receiving end, so as for the receiving end to perform scheduling processing on the data packet according to the QoS requirement information, may specifically include: the sending end sends the RLC protocol data packet carrying the QoS requirement information to the receiving end, so as for the receiving end to perform scheduling processing on the data packet according to the QoS requirement information.

In practical application, the sending end may be configured with a transmission latency priority threshold and a transmission reliability priority threshold, and the sending end may set that a data packet, of which transmission latency priority is larger than the transmission latency priority threshold, of which transmission reliability priority is larger than the transmission reliability priority threshold, which does not have an packet loss indication and which has an emergency indication, carries the QoS requirement information, rather than carrying the QoS requirement information in each data packet. This manner is beneficial to reduce bandwidth resource overhead of a system. For example, a data packet, of which transmission latency priority is larger than the transmission latency priority threshold, of which transmission reliability priority is larger than the transmission reliability priority threshold, which does not have an packet loss indication and which has an emergency indication, carries the QoS requirement information; and a data packet, of which transmission latency priority is smaller than the transmission latency priority threshold, of which transmission reliability priority is smaller than the transmission reliability priority threshold, which has an packet loss indication and which does not have an emergency indication, does not carry the QoS requirement information. When the receiving end receives a data packet not carrying QoS requirement information, the receiving end processes the data packet according to a manner of low priority indicated by the QoS requirement information, and vice versa, which will not be described redundantly herein. The inter-frame dependency information, the quality information of a frame and the indication information of a layer may also be treated similarly as that for the QoS requirement information, which is not be described redundantly herein as well.

For example, when the sending end judges that a packet loss rate of data packets of a key frame has to be lower than 10-6 and a packet loss rate of data packets of a non-key frame may be higher than 10-6, the sending end may set a data packet of the key frame as a data packet of high reliability level, and do not set reliability level for a data packet of the non-key frame. When a receiving end receives a data packet carrying high priority information, the receiving end processes the data packet as a data packet with high priority, and when the receiving end receives a data packet not carrying high priority information, the receiving end processes the data packet as a data packet with non-high priority.

According to the method for transmitting a data packet of the above-mentioned embodiment, a sending end sets QoS requirement information for service data according to content or type of the service data, wherein the QoS requirement information includes at least one of transmission latency priority, transmission reliability priority, a packet loss indication and an emergency indication, and carries the QoS requirement information in a data packet sent to a receiving end, so that the receiving end may preform scheduling processing on the received data packet according to the QoS requirement information. By adopting the technical solution of the above-mentioned embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

Figure 7:
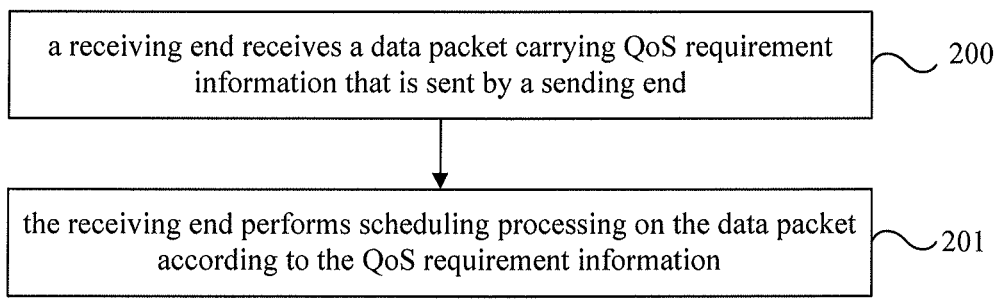
FIG. 7 is a flowchart of a method for transmitting a data packet provided by another embodiment of the present invention.

FIG. 7 is a flowchart of a method for transmitting a data packet provided by another embodiment of the present invention. As shown in FIG. 7, the method for transmitting a data packet of the present embodiment may specifically include the following steps.

200, a receiving end receives a data packet carrying QoS requirement information, that is sent by a sending end.

The QoS requirement information in the present embodiment is determined by the sending end according to content or type of service data, and the QoS requirement information includes at least one of transmission latency priority, transmission reliability priority, a packet loss indication and an emergency indication.

201, the receiving end performs scheduling processing on the data packet according to the QoS requirement information.

The only difference between the method for transmitting a data packet of the present embodiment and the embodiment shown in FIG. 1 lies in that, in the method for transmitting a data packet of the embodiment shown by FIG. 1, the technical solution of the present invention is described on a sending end side, while in the present embodiment, the technical solution of the present invention is described on a receiving end side. For detailed description of the method for transmitting a data packet of the present embodiment, reference may be made to disclosure of the above-mentioned embodiment shown by FIG. 1, and will not be described redundantly herein.

According to the method for transmitting a data packet of the present embodiment, a receiving end receives a data packet carrying QoS requirement information that is sent by a sending end, wherein the QoS requirement information is determined by the sending end according to content or type of service data, and includes at least one of transmission latency priority, transmission reliability priority, a packet loss indication and an emergency indication; and the receiving end preforms scheduling processing on the data packet according to the QoS requirement information. By adopting the technical solution of the above-mentioned embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

Optionally, based on the embodiment shown by FIG. 7, the following optional technical solution may be further included to form an expanded embodiment of the embodiment shown by FIG. 7.

In the expanded embodiment of the embodiment shown by FIG. 7, the sending end may specifically be a gateway node (Gateway node) or a server (Server), and the receiving end is a base station (e.g., eNodeB). In this case, correspondingly, in the embodiment shown by FIG. 7, the step 200 may specifically include the following conditions.

First condition: when the service data is video service data, the receiving end receives a data packet including an Initialization Segment and/or a Media Segment, that is sent by the sending end, wherein the QoS requirement information is carried in an residual bit or a newly added bit of the Initialization Segment and/or the Media Segment.

Second condition: the receiving end receives a GTP data packet carrying the QoS requirement information, that is sent by the sending end, wherein the QoS requirement information is carried in first expansion header information that is newly added in a packet header of the GTP data packet.

Third condition: the receiving end receives an IP data packet carrying the QoS requirement information, that is sent by the sending end, wherein the QoS requirement information is carried in a packet header of the IP data packet.

Further, optionally, when the service data is video service data, the QoS requirement information further includes at least one of inter-frame dependency information, quality information of a frame and indicating information of a layer.

Optionally, when the receiving end is a base station, in this case, correspondingly, the step 201, the receiving end performs scheduling processing on the data packet according to the QoS requirement information, may specifically include the following manners.

In a first manner, the base station transmits the data packet in a manner of increasing the number of retransmission times of a hybrid automatic repeat request (Hybrid Automatic Repeat Request, HARQ) according to the QoS requirement information. For example, when the base station receives a data packet carrying high reliability priority information, the base station may increase the number of retransmission times of the data packet with high priority, so as to increase transmission reliability of the data packet.

In a second manner, the base station transmits the data packet in a manner of low-order modulation coding scheme (Modulation Coding Scheme, MCS) with high reliability according to the QoS requirement information.

In a third manner, the base station increases sending power of transmission of the data packet according to the QoS requirement information.

In a fourth manner, the base station gives higher scheduling priority to current UE according to the QoS requirement information, for example, when the base station receives a data packet carrying high latency priority information, the base station may give higher scheduling priority to currently served UE or data and schedule the data packet preferentially.

In a fifth manner, according to the QoS requirement information, the base station determines that the data packet may be discarded only if the data packet is successfully received by the UE. For example, when the base station receives a data packet carrying an indication that it is not allowed to discard the data packet, the data packet being cached for too long time is not a reason for the base station to discard the data packet, until the data packet is received by the UE.

The above-mentioned several manners are merely exemplary, and in practical application, besides the above-mentioned conditions, a data packet may also be transmitted in other expansion manner, which will not be enumerated herein.

Optionally, in the expanded embodiment of the embodiment shown by FIG. 7, the sending end may specifically be a base station (e.g., eNodeB), and the receiving end may specifically be UE. In this case, correspondingly, in the above-mentioned embodiment, the step 200 may specifically include the following conditions.

First condition: the receiving end receives a PDCP data packet carrying the QoS requirement information, that is sent by the sending end, wherein the QoS requirement information is carried in second expansion header information that is newly added in a packet header of the PDCP data packet; or optionally, a PDCP entity in the base station may send data to the UE according to the QoS requirement information corresponding to the data packet, for example, when the PDCP data packet corresponds to a high transmission reliability priority, after sending the PDCP data packet to a bottom layer, the PDCP entity in the base station resends the PDCP data packet if a transmission failure acknowledgement of the bottom layer is received or a transmission success acknowledgement is not received. For another example, when the PDCP data packet is sent to the bottom layer, a retransmission timer pre-configured by the base station is started, and if a response of successful receiving corresponding to the PDCP data packet is still not obtained after timeout of the retransmission timer, the PDCP data packet is retransmitted. On the contrary, if the PDCP data packet corresponds to a low transmission reliability priority, there is no need to wait for a transmission success acknowledgement of the bottom layer for discarding the PDCP data packet.

Second condition: the receiving end receives an RLC protocol data packet carrying the QoS requirement information, that is sent by the sending end, wherein the QoS requirement information is carried in third expansion header information that is newly added in a packet header of the RLC protocol data packet.

Optionally, when the receiving end is UE, in this case, correspondingly, the step 201, the receiving end performs scheduling processing on the data packet according to the QoS requirement information, may specifically include: the UE receives the data packet and submits the data packet to an upper layer application. For example, the UE may submit the data packet to the upper layer according to the QoS requirement information carried in the data packet.

For example, if the data packet is indicated as an emergency data packet and/or as a data packet with high transmission latency priority, the UE may directly submit the data packet instead of submitting the data packets in sequence after waiting for receiving a previous disordered data packet, so that the data packet may be processed promptly according to the QoS requirement information of the data packet, thereby effectively improving the processing efficiency of the data packet.

The only difference between the method for transmitting a data packet of the expanded embodiment of the embodiment shown by FIG. 7 and the expanded embodiment of the embodiment shown by FIG. 1 lies in that, for the method for transmitting a data packet in the expanded embodiment of the embodiment shown by FIG. 1, the technical solution of the present invention is described on the sending end side, while for the expanded embodiment of the embodiment shown by FIG. 7, the technical solution of the present invention is described on the receiving end side. For detailed description of the expanded embodiment of the embodiment shown by FIG. 7, reference may be made to disclosure of the expanded embodiment of the above-mentioned embodiment shown by FIG. 1, which will not be described redundantly herein.

According to the method for transmitting a data packet of the above-mentioned embodiment, a receiving end receives a data packet carrying QoS requirement information that is sent by a sending end, wherein the QoS requirement information is determined by the sending end according to content or type of service data, and includes at least one of transmission latency priority, transmission reliability priority, a packet loss indication and an emergency indication; and then the receiving end preforms scheduling processing on the data packet according to the QoS requirement information. By adopting the technical solution of the above-mentioned embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

Persons of ordinary skill in the art may understand that all or a part of the steps of the above-mentioned method embodiments may be implemented by relevant hardware instructed by a program. The foregoing program may be stored in a computer readable storage medium. When the program runs, the steps of the above-mentioned method embodiments are executed; and the foregoing storage medium includes a variety of media capable of storing program codes, such as an ROM, an RAM, a magnetic disk, an optical disk or the like.

Figure 8:
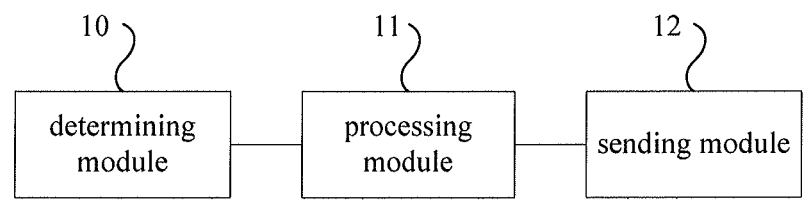
FIG. 8 is a schematic diagram of a structure of a sending end device provided by an embodiment of the present invention.

FIG. 8 is a schematic diagram of a structure of a sending end device provided by an embodiment of the present invention. As shown in FIG. 8, the sending end device of the embodiment may specifically include a determining module 10, a processing module 11 and a sending module 12.

The determining module 10 is configured to determine QoS requirement information of service data according to content or type of the service data, wherein the QoS requirement information includes at least one of transmission latency priority, transmission reliability priority, a packet loss indication and an emergency indication. The processing module 11 is connected to the determining module 10, and the processing module 11 is configured to carry the QoS requirement information determined by the determining module 10 in a data packet corresponding to the service data. The sending module 12 is connected to the processing module 11, and the sending module 12 is configured to send the data packet carrying the QoS requirement information, that is processed by the processing module 11, to receiving end device, so as for the receiving end device to perform scheduling processing on the data packet according to the QoS requirement information.

According to the sending end device of the embodiment, an implementation mechanism of transmitting the data packet by using the above-mentioned modules is the same as that of the above-mentioned relevant method embodiments. For detailed description of the sending end device, reference may be made to the disclosure of the above-mentioned relevant method embodiments, which will not be described redundantly herein.

According to the sending end device of the present embodiment, the sending end determines QoS requirement information for service data according to content or type of the service data, wherein the QoS requirement information includes at least one of transmission latency priority, transmission reliability priority, a packet loss indication and an emergency indication, and carries the QoS requirement information in a data packet sent to a receiving end, so that the receiving end may preform scheduling processing on the received data packet according to the QoS requirement information. By adopting the technical solution of the above-mentioned embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

Optionally, in the embodiment shown by FIG. 8, the sending end may specifically be a gateway node (Gateway node) or a server (Server), and the receiving end is a base station (e.g., eNodeB). In this case, correspondingly, an specific execution manner of the processing module 11 and the sending module 12 in the above-mentioned embodiment may include the following conditions.

First condition: when the service data is video service data, the processing module 11 is specifically configured to carry the QoS requirement information determined by the determining module 10 in a residual bit of an Initialization Segment and/or a Media Segment; and the sending module 12 is specifically configured to send a data packet including the Initialization Segment and/or the Media Segment, that is obtained by the processing module 11, to the receiving end device, so as for the receiving end device to perform scheduling processing on the data packet including the Initialization Segment and/or the Media Segment according to the QoS requirement information carried in the Initialization Segment and/or the Media Segment.

Second condition: when the service data is video service data, the processing module 11 is specifically configured to carry the QoS requirement information determined by the determining module 10 in a newly added bit of an Initialization Segment and/or a Media Segment; and the sending module 12 is specifically configured to send a data packet including the Initialization Segment and/or the Media Segment, that is obtained by the processing module 11, to the receiving end device, so as for the receiving end device to perform scheduling processing on the data packet including the Initialization Segment and/or the Media Segment according to the QoS requirement information carried in the Initialization Segment and/or the Media Segment.

Further, optionally, when the service data is video service data, the QoS requirement information further includes at least one of inter-frame dependency information, quality information of a frame and indicating information of a layer.

Third condition: the processing module 11 is specifically configured to add first expansion header information in a packet header of a GPT data packet, the GPT data packet includes service data; and carry the QoS requirement information determined by the determining module 10 in the first expansion header information. The sending module 12 is specifically configured to send the GTP data packet carrying the QoS requirement information, that is obtained by the processing module 11, to the receiving end device, so as for the receiving end device to perform scheduling processing on the GTP data packet according to the QoS requirement information.

Fourth condition: the processing module 11 is specifically configured to carry the QoS requirement information determined by the determining module 10 in a packet header of an IP data packet; and the sending module 12 is specifically configured to send the IP data packet carrying the QoS requirement information, that is obtained by the processing module 11, to the receiving end device, so as for the receiving end device to perform scheduling processing on the IP data packet according to the QoS requirement information.

Optionally, in the embodiment shown by FIG. 8, the sending end may specifically be a base station (e.g., eNodeB), and the receiving end may specifically be UE. In this case, correspondingly, an specific implementation manner of the processing module 11 and the sending module 12 in the above-mentioned embodiment may include the following conditions.

First condition: the processing module 11 is specifically configured to add second expansion header information in a packet header of a PDCP data packet, wherein the PDCP data packet includes service data; and carry the QoS requirement information determined by the determining module 10 in the second expansion header information. The sending module 12 is specifically configured to send the PDCP data packet carrying the QoS requirement information, that is obtained by the processing module 11, to the receiving end device, so as for the receiving end device to perform scheduling processing on the PDCP data packet according to the QoS requirement information.

Second condition: the processing module 11 is specifically configured to add third expansion header information in a packet header of an RLC protocol data packet, wherein the RLC protocol data packet includes service data; and carry the QoS requirement information determined by the determining module 10 in the third expansion header information. The sending module 12 is specifically configured to send the RLC protocol data packet carrying the QoS requirement information, that is obtained by the processing module 11, to the receiving end device, so as for the receiving end device to schedule the RLC protocol data packet according to the QoS requirement information.

According to the sending end device of the embodiment, an implementation mechanism of transmitting the data packet by using the above-mentioned modules is the same as that of the above-mentioned relevant method embodiments. For detailed description of the sending end device, reference may be made to the disclosure of the above-mentioned relevant method embodiments, which will not be described redundantly herein.

By adopting the sending end device of the above-mentioned embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

Figure 9:
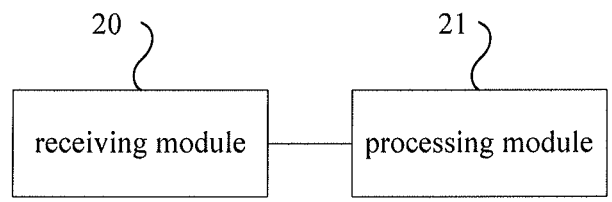
FIG. 9 is a schematic diagram of a structure of a receiving end device provided by an embodiment of the present invention.

FIG. 9 is a schematic diagram of a structure of a receiving end device provided by an embodiment of the present invention. As shown in FIG. 9, the receiving end device of the present embodiment may specifically include a receiving module 20 and a processing module 21.

The receiving module 20 is configured to receive a data packet carrying QoS requirement information, that is sent by sending end device, wherein the QoS requirement information is determined by the sending end device according to content or type of service data, and the QoS requirement information includes at least one of transmission latency priority, transmission reliability priority, a packet loss indication and an emergency indication. The processing module 21 is connected to the receiving module 20, and the processing module 21 is configured to perform scheduling processing on the data packet according to the QoS requirement information received by the receiving module 20.

According to the receiving end device of the embodiment, an implementation mechanism of transmitting the data packet by using the above-mentioned modules is the same as that of the above-mentioned relevant method embodiments.

For detailed description of the receiving end device, reference may be made to the disclosure of the above-mentioned relevant method embodiments, which will not be described redundantly herein.

According to the receiving end device of the present embodiment, the receiving end receives a data packet carrying QoS requirement information that is sent by a sending end, wherein the QoS requirement information is determined by the sending end according to content or type of service data, and includes at least one of transmission latency priority, transmission reliability priority, a packet loss indication and an emergency indication; and then the receiving end preforms scheduling processing on the data packet according to the QoS requirement information. By adopting the technical solution of the above-mentioned embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

Optionally, in the embodiment shown by FIG. 9, the sending end may specifically be a gateway node (Gateway node) or a server (Server), and the receiving end is a base station (e.g., eNodeB). In this case, correspondingly, an specific implementation manner of the receiving module 20 in the above-mentioned embodiment may include the following conditions.

When the service data is video service data, the receiving module 20 is specifically configured to receive a data packet including an Initialization Segment and/or a Media Segment, that is sent by the sending end device, wherein the QoS requirement information is carried in a residual bit or in an newly added bit of the Initialization Segment and/or the Media Segment.

Or, the receiving module 20 is specifically configured to receive a GTP data packet carrying the QoS requirement information, that is sent by the sending end device, wherein the QoS requirement information is carried in first expansion header information that is newly added in a packet header of the GTP data packet.

Or, the receiving module 20 is specifically configured to receive an IP data packet carrying the QoS requirement information, that is sent by the sending end device, wherein the QoS requirement information is carried in a packet header of the IP data packet.

Further, when the service data is video service data, the QoS requirement information further includes at least one of inter-frame dependency information, quality information of a frame and indicating information of a layer.

Optionally, in the embodiment shown by FIG. 9, the sending end may specifically be a base station (e.g., eNodeB), and the receiving end may specifically be UE. In this case, correspondingly, an specific implementation manner of the receiving module 20 in the above-mentioned embodiment may include the following conditions.

The receiving module 20 is specifically configured to receive a PDCP data packet carrying the QoS requirement information, that is sent by the sending end device, wherein the QoS requirement information is carried in second expansion header information that is newly added in a packet header of the PDCP data packet; or the receiving module 20 is specifically configured to receive an RLC protocol data packet carrying the QoS requirement information, that is sent by the sending end device, wherein the QoS requirement information is carried in third expansion header information that is newly added in a packet header of the RLC protocol data packet.

According to the receiving end device of the embodiment, an implementation mechanism of transmitting the data packet by using the above-mentioned modules is the same as that of the above-mentioned relevant method embodiments. For detailed description of the receiving end device, reference may be made to the disclosure of the above-mentioned relevant method embodiments, and will not be described redundantly herein.

By adopting the receiving end device of the above-mentioned embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

Figure 10:
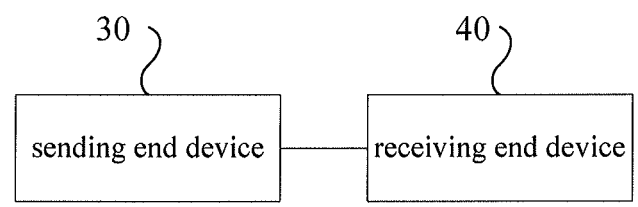
FIG. 10 is a schematic diagram of a structure of a system for transmitting a data packet provided by an embodiment of the present invention.

FIG. 10 is a schematic diagram of a structure of a system for transmitting a data packet provided by an embodiment of the present invention. As shown in FIG. 10, the system for transmitting a data packet of the present embodiment may specifically include a sending end device 30 and a receiving end device 40. The sending end device 30 is connected to the receiving end device 40, and can perform data communication with the receiving end device 40.

In the present embodiment, the sending end device 30 is configured to determine QoS requirement information of service data according to content or type of the service data, wherein the QoS requirement information includes at least one of transmission latency priority, transmission reliability priority, a packet loss indication and an emergency indication; carry the set QoS requirement information in a data packet corresponding to the service data; and send the data packet carrying the QoS requirement information to the receiving end device 40.

The receiving end device 40 is configured to receive the data packet carrying the QoS requirement information that is sent by the sending end device 30, and perform scheduling processing on the data packet according to the received QoS requirement information.

Specifically, in the present embodiment, the sending end device 30 may specifically adopt the sending end device as shown in FIG. 8 and in the expanded embodiment thereof, and the receiving end device 40 may specifically adopt the receiving end device as shown in FIG. 9 and in the expanded embodiment thereof. Moreover, in the present embodiment, the sending end device 30 and the receiving end device 40 may transmit a data packet by adopting the methods for transmitting a data packet as shown in FIG. 1 and FIG. 7 and in the expanded embodiments corresponding thereto. For detailed description of the sending end device 30 and the receiving end device 40, reference may be made to recordings in the above-mentioned embodiments, and will not be described redundantly herein.

The sending end device 30 in the present embodiment may specifically be a gateway node (Gateway node) or a server (Server), and the receiving end device 40 is a base station (e.g., eNodeB). Or, the sending end device 30 may specifically be a base station (e.g. eNodeB), and the receiving end device 40 may specifically be UE.

The system for transmitting a data packet of the present embodiment adopts the above-mentioned sending end device and receiving end device. The sending end device sends a data packet carrying the QoS requirement information to the receiving end device, and the receiving end device performs scheduling processing on the data packet according to the QoS requirement information. By adopting the technical solution of the present embodiment, a shortcoming of the prior art, i.e., low processing efficiency of data packets, caused by centralized processing of all data packets, may be overcome, and a received data packet is scheduled according to the quality of service requirement information, thereby effectively improving the processing efficiency of the data packet.

The device embodiments described above are merely exemplary, wherein units described as separate components may be physically separated or not, and components displayed as units may be physical units or not, namely, may be located at one place or distributed on at least two network units. A part or all of the modules may be selected according to practical requirements so as to achieve the purpose of the technical solution in the present embodiment. Those of ordinary skill in the art may understand and implement the selection without any creative effort.

Finally, it should be noted that the above-mentioned respective embodiments are merely used for illustrating, rather than limiting, the technical solutions of the present invention. Although the present invention has been described in detail with reference to the foregoing embodiments, it should be understood by those of ordinary skill in the art that modifications can still be made to the technical solutions disclosed in the foregoing respective embodiments, or equivalent substitutions can be made to a part or all of technical features therein; and these modifications or substitutions do not make the essence of the corresponding technical solution depart from the scope of the technical solution of the respective embodiments of the present invention.

What is claimed is:

1. A method for transmitting a data packet, comprising:
determining, by a sending end, quality of service requirement information of service data according to one of content and type of the service data, wherein the quality of service requirement information comprises at least one of transmission latency priority, transmission reliability priority, a packet loss indication and an emergency indication;
carrying, by the sending end, the quality of service requirement information in a data packet corresponding to the service data; and
sending, by the sending end, the data packet carrying the quality of service requirement information to a receiving end, so as for the receiving end to perform scheduling processing on the data packet according to the quality of service requirement information;
wherein the carrying, by the sending end, the quality of service requirement information in the data packet corresponding to the service data, comprises:
adding, by the sending end, second expansion header information in a packet header of a packet data convergence protocol data packet, wherein the packet data convergence protocol data packet comprises the service data; and
carrying, by the sending end, the quality of service requirement information in the second expansion header information; and
wherein the sending, by the sending end, the data packet carrying the quality of service requirement information to the receiving end, so as for the receiving end to perform scheduling processing on the data packet according to the quality of service requirement information, comprises:
sending, by the sending end, the packet data convergence protocol data packet carrying the quality of service requirement information to the receiving end, so as for the receiving end to perform scheduling processing on the packet data convergence protocol data packet according to the quality of service requirement information.

2. A method for transmitting a data packet, comprising:
receiving, by a receiving end, a data packet carrying quality of service requirement information, that is sent by a sending end, wherein the quality of service requirement information is determined by the sending end according to one of content and type of service data, and the quality of service requirement information comprises at least one of transmission latency priority, transmission reliability priority, a packet loss indication and an emergency indication; and
performing, by the receiving end, scheduling processing on the data packet according to the quality of service requirement information;
wherein the receiving, by the receiving end, the data packet carrying quality of service requirement information, that is sent by the sending end, comprises:
receiving, by the receiving end, a packet data convergence protocol data packet carrying the quality of service requirement information, that is sent by the sending end, wherein the quality of service requirement information is carried in second expansion header information that is newly added in a packet header of the packet data convergence protocol data packet; or
receiving, by the receiving end, a radio link control protocol data packet carrying the quality of service requirement information, that is sent by the sending end, wherein the quality of service requirement information is carried in third expansion header information that is newly added in a packet header of the radio link control protocol data packet.

3. A sending end device, comprising:
a determining module, configured to determine quality of service requirement information of service data according to one of content and type of the service data, wherein the quality of service requirement information comprises at least one of transmission latency priority, transmission reliability priority, a packet loss indication and an emergency indication;
a processing module, configured to carry the quality of service requirement information determined by the determining module in a data packet corresponding to the service data; and
a sending module, configured to send the data packet carrying the quality of service requirement information that is processed by the processing module to a receiving end device, so as for the receiving end device to perform scheduling processing on the data packet according to the quality of service requirement information;
wherein the processing module is specifically configured to add second expansion header information in a packet header of a packet data convergence protocol data packet wherein the packet data convergence protocol data packet comprises the service data; and carry the quality of service requirement information in the second expansion header information; and
wherein the sending module is specifically configured to send the packet data convergence protocol data packet carrying the quality of service requirement information to the receiving end device, so as for the receiving end device to perform scheduling processing on the packet data convergence protocol data packet according to the quality of service requirement information.

4. A receiving end device, comprising:
a receiving module, configured to receive a data packet carrying quality of service requirement information, that is sent by a sending end device, wherein the quality of service requirement information is determined by the sending end according to one of content and type of service data, and the quality of service requirement information comprises at least one of transmission latency priority, transmission reliability priority, a packet loss indication and an emergency indication; and a processing module, configured to perform scheduling processing on the data packet according to the quality of service requirement information received by the receiving module;

wherein the receiving module is specifically configured to:

receive a packet data convergence protocol data packet carrying the quality of service requirement information, that is sent by the sending end device, wherein the quality of service requirement information is carried in second expansion header information that is newly added in a packet header of the packet data convergence protocol data packet; or receive a radio link control protocol data packet carrying the quality of service requirement information, that is sent by the sending end device, wherein the quality of service requirement information is carried in third expansion header information that is newly added in a packet header of the radio link control protocol data packet; and wherein the sending end device is a base station, and the receiving end device is user equipment.

* * * * *